United States Patent Office 3,148,116
Patented Sept. 8, 1964

3,148,116
18-NOR-Δ⁴-PREGNENE-3,11,20-TRIONE AND ITS USE
Gaston Amiard, Noisy-le-Sec, and René Heymes, Romainville, France, assignors to Roussel-UCLAF, S.A., Paris, France, a corporation of France
No Drawing. Filed Apr. 17, 1962, Ser. No. 188,241
Claims priority, application France, Apr. 19, 1961, 859,216
2 Claims. (Cl. 167—65)

The invention relates to the novel steroid, 18-nor-Δ⁴-pregnene-3,11,20-trione, and a novel process for its preparation and novel intermediates thereof. The invention also relates to novel compositions and a novel method for the treatment of hyperlipemia.

18-nor-Δ⁴-pregnene-3,11,20-trione possesses antilipemic activity and can be used for the treatment of atheromatosis, atherosclerosis, lipidic nephrosis, toxic hepatic steatosis, which may be endocrinallic or infectious, and hypercholesterolemia.

It is an object of the invention to provide the novel product, 18-nor-Δ⁴-pregnene-3,11,20-trione.

It is another object of the invention to provide a novel process for the preparation of 18-nor-Δ⁴-pregnene-3,11,20-trione.

It is a further object of the invention to provide novel intermediates, namely,
(a) 18-nor-pregnane-3,11,20-trione
(b) 4ξ-bromo-18-nor-pregnane-3,11,20-trione.

It is an additional object of the invention to provide novel compositions for the treatment of hyperlipemia.

It is also an object of the invention to provide a novel method for the treatment of hyperlipemia.

These and other objects of the invention will become obvious from the following detailed description.

The novel 18-nor-Δ⁴-pregnene-3,11,20-trione of the invention has the formula

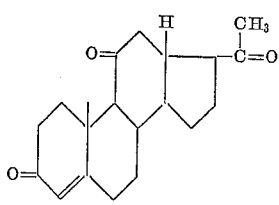

and is prepared by hydrogenating 18-nor-Δ¹⁶-pregnene-3,11,20-trione to form 18-nor-pregnane-3,11,20-trione, brominating the latter to form 4ξ-bromo-18-nor-pregnane-3,11,20-trione, dehydrobrominating the latter to form 18-nor-Δ⁴-pregnene-3,11,20-trione, and recovering the latter.

A preferred mode of the process comprises hydrogenating 18-nor-Δ¹⁶-pregnene-3,11,20-trione in the presence of a palladium catalyst such as palladium chloride to form 18-nor-pregnane-3,11,20-trione, brominating the latter with bromine in acetic acid to form 4ξ-bromo-18-nor-pregnane-3,11,20-trione, dehydrobrominating the latter in a N,N-dilower alkyl amide of a lower alkanoic acid such as dimethyl formamide with a mixture of lithium carbonate and lithium bromide to form 18-nor-Δ⁴-pregnene-3,11,20-trione, and recovering the latter. The reaction scheme is illustrated in Table I.

TABLE I

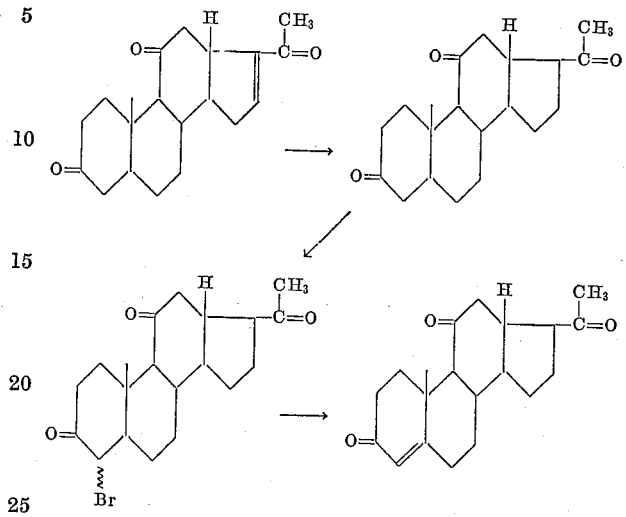

The novel compositions of the invention are comprised of 18-nor-Δ⁴-pregnene-3,11,20-trione and a pharmaceutical carrier. The compositions can be prepared in the form of injectable solutes or injectable suspensions, prepared in ampules or multiple dose flacons, in the form of tablets, and suppositories according to the usual techniques. The usual dose is between 5 and 20 mg. for adults.

The novel method for the treatment of hyperlipemia comprises administering an effective daily amount of 18-nor-Δ4-pregnene-3,11,20-trione. It may be administered by oral, transcutaneous or rectal methods. The usual daily dose is between 10 and 40 mg.

In the following example there are described several preferred embodiments to illustrate the invention. However, it should be understood that the invention is not intended to be limited to the specific embodiments.

*Example I*

Step A: *Reduction of the 16,17 double bond.*—A current of hydrogen was caused to bubble through a mixture of 1.5 gm. of active charcoal, 40 cc. of water, and 6.0 cc. of 2% palladium chloride, until absorption of 55 cc. of hydrogen occurred. The catalyst product was vacuum filtered, washed with water, then with alcohol.

The catalyst was introduced into a suspension of 5 g. of 18-nor-Δ¹⁶-pregnene-3,11,20-trione in 150 cc. of alcohol. The steroid was obtained according to the method described by Velluz et al., Comptes Rendus de l'Academie des Sciences, 1960, 250, 371–373. A current of hydrogen was passed therethrough for a period of 8 minutes. Then the product obtained was vacuum filtered and washed with alcohol. The product was redissolved in 15 cc. of acetone and after 2 cc. of hydrochloric acid were added thereto, the mixture was heated to reflux for a period of 2 minutes. The acetone was distilled off under vacuum. Then 10 cc. of water were added and the aqueous mixture was extracted with methylene chloride. The extracts were dried over magnesium sulfate and evaporated to dryness under vacuum. The residue was crystallized from hexane and supplied 4.10 g. of 18-nor-pregnane-3,11,20-trione, having a melting point of 160° C. and a specific rotation $[\alpha]_D^{20}=+78°\pm1°$ C. (c.=1% in chloroform).

*Analysis.*—$C_{20}H_{28}O_3$; molecular weight=316.42. Calculated: C, 75.91%; H, 8.92%. Found: C, 75.8%; H, 8.7%.

This compound is not described in the literature.

*Step B: Introduction of the 4,5 double bond.*—4 g. of 18-nor-pregnane-3,11,20-trione were dissolved in 90 cc. of chloroform and 9 cc. of acetic acid. The solution was cooled to —64° C. and 12.6 cc. of a solution of 7.3 g. of hydrobromic acid, 14.6 g. of bromine and sufficient acetic acid to bring the volume to 90 cc. were introduced over a space of 45 minutes. The reaction mixture was agitated at —60° C. for a period of 30 minutes. 2.8 g. of sodium acetate and 15 cc. of water were added. The temperature was brought to 0° C. and the solution was poured into water containing 1% of 0.1 N sodium hyposulfite solution. The aqueous layer was decanted and extracted with chloroform. The chloroform extracts were washed with a solution of sodium bicarbonate, dried, and evaporated to dryness under vacuum. The syrup obtained crystallized by the addition of ether. 3.885 g. of 4ξ-bromo-18-nor-pregnane-3,11,20-trione were obtained. The product melted towards 190° C. and was utilized without purification for the next step of the synthesis.

The said 4ξ-bromo derivative was introduced into 40 cc. of dimethylforamide. 2.5 g. of lithium bromide and 1.3 g. of lithium carbonate were added, and the mixture thus formed was heated under an atmosphere of nitrogen to 135° C. for a period of 30 minutes. After cooling, the reaction mixture was poured into water containing 1% acetic acid and was extracted with methylene chloride. The methylene chloride extracts were washed with water, dried and evaporated to dryness under vacuum. The residue was recrystallized from hot hexane and hot cyclohexane. 18-nor-$\Delta^4$-pregnene-3,11,20-trione was obtained having a melting point of 152–154° C. and a specific rotation $[\alpha]_D^{20}=+240°\pm2°$ C. (c.=1% in chloroform).

The product occurred in the form of colorless prisms, very soluble in chloroform, soluble in acetone, slightly soluble in alcohol and benzene, and insoluble in ether and water.

*Analysis.*—$C_{20}H_{26}O_3$; molecular weight=314.41. Calculated: C, 76.40%; H, 8.34%. Found: C, 76.6%; H, 8.3%.

Ultraviolet spectra in ethanol: $\lambda_{max.}=239$ m$\mu$, $\epsilon=15,500$.

This compound is not described in the literature.

THERAPEUTIC EFFECT ON POST-PRANDIAL HYPERLIPEMIA IN DOGS

The test was performed on two groups of two dogs each in which hyperlipemia had been produced by the oral administration of 10 g./kg. of fresh cream. Two dogs served as controls and the two others were treated with 18-nor-$\Delta^4$-pregnene-3,11,20-trione administered in suspension by subcutaneous injection at a dose of 4 mg./kg. immediately after the ingestion of the cream.

The activity of the product was determined by measuring the plasmatic turbidity and by effecting a Kunkel test to phenol on the blood samples taken from the animals of the two groups at 0 hour, that is to say, immediately before the ingestion of the cream, at 3 hours, 5 hours and 7 hours afterward (blood recovered on citrate and centrifuged). The same test was reproduced by crossing the animals 8 days after the first test.

Examination of the table below, showing the average of results obtained in the course of the two tests on four control dogs and four treated dogs, shows that at a dose of 4 mg./kg., 18-nor-$\Delta^4$-pregnene-3,11,20-trione strongly diminishes the turbidity of the plasma after a meal rich in fats and that it diminishes equally postprandial hyperlipemia measured by the Kunkel reaction to phenol.

TEST OF HYPERLIPEMIA ARTIFICIALLY PRODUCED IN DOGS

|  |  | 0 Hour | 3 Hours | 5 Hours | 7 Hours |
|---|---|---|---|---|---|
| Plasmatic turbidity (in Vernes units). | Control Dogs. | 54 | 82 | 93 | 73 |
|  | Treated Dogs. | 25 | 91 | 76 | 53 |
| Kunkel Test to Phenol (Vernes units). | Control Dogs. | 105 | 121 | 119 | 122 |
|  | Treated Dogs. | 101 | 101 | 98 | 105 |

DETERMINATION OF ACUTE TOXICITY

The test was made on mice of the Rockland strain weighing between 18 and 20 g. The product was placed in supension in water and polysorbate 80 at a concentration of 10 mg./cc. The compound was administered by subcutaneous injection in doses of 50 mg./kg. and 100 mg./kg. apiece to groups of ten mice per dose. The animals after observation for a period of one week presented no signs of intoxication and no mortality was observed. The absence of toxicity of 18-nor-$\Delta^4$-pregnene-3,11,20-trione can thus be concluded even at a dose of 100 mg./kg. administered subcutaneously in mice.

Various modifications of the process of the invention may be made without departing from the spirit or scope thereof, and it is to be understood that the invention is to be limited only as defined in the appended claims.

We claim:

1. 18-nor-$\Delta^4$-pregnene-3,11,20-trione.
2. A composition for the treatment of hyperlipemia comprising 5 to 20 mg. of 18-nor-$\Delta^4$-pregnene-3,11,20-trione and a pharmaceutical carrier.

References Cited in the file of this patent

UNITED STATES PATENTS

| 2,880,135 | Eppstein | Mar. 31, 1959 |
| 2,964,544 | Ringold et al. | Dec. 13, 1960 |
| 3,032,567 | Nomine et al. | May 1, 1962 |

OTHER REFERENCES

Anliker et al.: Helv. Chim. Acta, vol. XLII (1959), pp. 1071–85.

Holysz: J.A.C.S., 75 (1953), pp. 4432–37.